3,449,340
TRIAZINES CONTAINING OXETANE GROUPS
Hans Orth, Binningen, and Ulrich Niklaus, Basel, Switzerland, assignors to Ciba Limited, Basel, Switzerland, a company of Switzerland
No Drawing. Filed Nov. 18, 1966, Ser. No. 595,326
Claims priority, application Switzerland, Nov. 22, 1965, 16,070/65
Int. Cl. C07d 55/50; C08g 43/00
U.S. Cl. 260—248  4 Claims

ABSTRACT OF THE DISCLOSURE

Compounds containing at least two oxetane groups of the general formula (I) 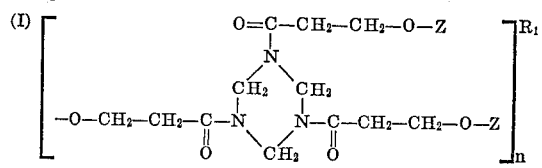

in which Z represents a residue of the formula

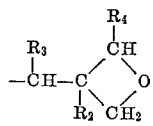

where $R_2$ represents a lower alkyl radical containing 1 to 4 carbon atoms, $R_3$ and $R_4$ each represents a hydrogen atom or the methyl group, $n=1$, 2 or 3, and $R_1$, when $n=1$ represents the residue of a monohydric alcohol or ether alcohol obtained on elimination of the alcoholic hydroxyl group, or has the same meaning as the residue Z or, when $n=2$ or 3, represents the residue of a dihydric or trihydric alcohol or ether alcohol obtained by elimination of the alcoholic hydroxyl groups, can be cured with compounds that polymerize the oxetane groups as such as form with them crosslinked polyadducts, to form insoluble and infusible products and can be used with special advantage as textile auxiliaries, as bonding agents for pigment dyeings and pigment prints on textile materials, as dyeing assistants and as coating agents for textiles, leather and paper.

---

The present invention provides new compounds containing at least two oxetane groups of the general formula (I) 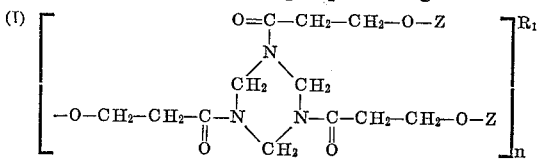

in which Z represents a residue of the formula

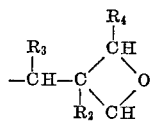

where $R_2$ represents a lower alkyl radical containing 1 to 4 carbon atoms, $R_3$ and $R_4$ each represents a hydrogen atom or the methyl group, $n=1$, 2 or 3, and $R_1$, when $n=1$ represents the residue of a monohydric alcohol or ether alcohol obtained on elimination of the alcoholic hydroxyl group, or has the same meaning as the residue Z or, when $n=2$ or 3, represents the residue of a dihydric or trihydric alcohol or ether alcohol obtained by elimination of the alcoholic hydroxyl groups.

According to this invention the new polyoxetanes are obtained by adding 2 or 3 mols of the alcohol Z—OH on to 1 mol of triacryloylperhydrotriazine, where Z has the same meaning as in the Formula I and, when only 2 mols of Z—OH are added on, 1 mol or $1/n$ equivalent of hydroxyl groups of an n-hydric aliphatic alcohol is added on.

Suitable alcohols Z—OH are above all 3-hydroxymethyl-3-ethyloxetane, 3-hydroxymethyl-3-methyloxetane and 3-($\alpha$-hydroxyethyl)-3-methyloxetane.

Particularly suitable aliphatic alcohols or ether alcohols are methanol, ethanol, n-propanol, n-butanol and ethyleneglycol monomethyl ether. As examples of suitable diols and triols there may be mentioned cyclohexane-1,1-dimethanol, trimethyleneglycol-(1,3), butyleneglycol-(1,4), butene(2)-diol-(1,4), diethyleneglycol, triethyleneglycol, diglycol ether, para, para'-bis-(hydroxymethyl)-diphenyl ether and N,N'-bis-(hydroxymethyl)-alkanedicarboxylic acid diamides such as N,N'-bis-(hydroxymethyl)-adipic acid diamide, trimethylolethane, trimethylolpropane and 2,2-bis-(hydroxymethyl)-3-hydroxybutane. The aliphatic alcohols may be reacted jointly with the oxetanecarbinol Z—OH or they may be added on first or afterwards.

The polyoxetanes of the Formula I according to this invention can be cured with compounds that polymerize the oxetane groups as such or form with them crosslinked polyadducts, to form insoluble and infusible products.

The polymerization of the oxetane groups is preferably carried out according to a cationic reaction mechanism, that is to say it is triggered by cationic initiators, especially by Lewis acids. As such initiators there may be mentioned, for example, Friedel-Crafts catalysts, for instance $AlCl_3$, $SbCl_3$, $SbF_5$, $SnCl_4$, $FeCl_3$, $ZnCl_2$, $BF_3$ and their complexes with organic compounds; metal fluoborates such as zinc fluoborate; $PF_5$; phosphoric acid, or salts of acid reaction, for example, zinc nitrate, diammonium phosphate or ammonium silicofluoride.

In many cases there are used for curing the polymers of this invention compounds that contain two or more functional groups capable of reacting with the oxetane groups, such as carboxyl groups or carboxylic acid anhydride groups.

As examples of such polyfunctional crosslinking agents there may be mentioned: Polybasic carboxylic acids and their anhydrides, for example, phthalic, methyl-endomethylene-tetrahydrophthalic, tetrahydrophthalic, hexahydrophthalic, methylhexahydrophtalic, dodecenylsuccinic, exachloro-endomethylenetetrahydrophthalic, maleic or succinic anhydride or mixtures thereof, if desired together with accelerators such as tertiary amines or strong acids such as para-toluenesulphonic acid.

A special advantage of the hot-curing mixtures of this invention, containing the new polyoxetanes and suitable crosslinking agents, such as carboxylic acid anhydrides, is their practically unlimited stability at room temperature. This makes it possible to manufacture storable and heat-resistant single component systems for a wide variety of industrial applications.

Quite generally, the polyoxetanes of this invention may be used wherever curable condensation resins and/or polymerization resins are used. They may be used by themselves or in conjunction with curing catalysts and/or crosslinking agents; also in conjunction with other curable condensation resins, such for instance as aminoplasts, phenoplasts, epoxy resins, polyacetals from polyalcohols and aldehydes, in the unfilled or filled state, and also in the form of solutions or emulsions as lacquers, paints, dipping resins, casting resins, coating and porefilling compositions, putties, adhesives and the like, and also for the manufacture of such products.

The new polyoxetanes are used with special advantage as textile auxiliaries, as bonding agents for pigment dyeings and pigment prints on textile materials, as dyeing assistants and as coating agents for textiles, leather and paper.

Parts and percentages in the following Examples are by weight. The relationship between part by weight and part by volume is the same as that between the kilogram and the litre.

Example 1.—1,3,5-tris[β-(3'-ethyl-1'-oxacyclobutyl-3'-methyloxy)propionyl]-perhydrotriazine

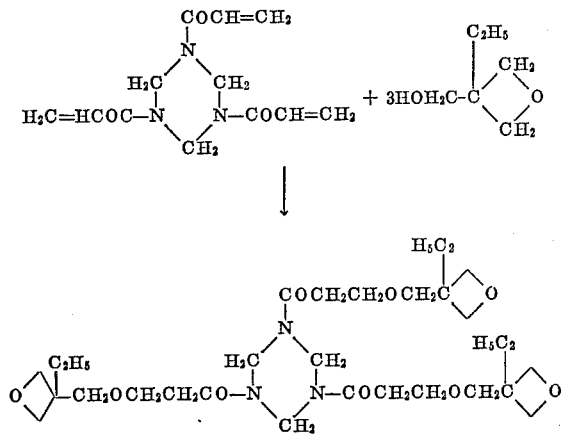

A 6-litre three-necked flask equipped with agitator, thermometer and dropping funnel is charged with 696, 9 g. (6.0 mols) of the above-mentioned oxetanecarbional and while heating and stirring it, 6.12 g. (0.27 gram atom) of sodium are dissolved in it. When all sodium has dissolved, the solution is diluted with 700 ml. of methylenechloride and a solution of 498.5 g. (2.0 mols) of triacryloyl-perhydrotriazine in 3600 ml. of methylenechloride is dropped in, while providing external cooling with ice-water, within 30 to 40 minutes at a rate such that the temperature of the reaction mixture is kept at 12 to 14° C.

On completion of the addition of the unsaturated amide the batch is stirred on for 2 hours at room tempertre, the sodium alcoholate serving as catalyst is neutralized with the equivalent amount of concentrated hydrochloric acid, and the precipitated sodium chloride is filtered off through kieselguhr (trademark "Hyflo-Supercel"). As much as possible of the methylenechloride is then expelled from the colourless to very faintly yellowish filtrate on a rotary evaporator at 20° C. bath temperature, first under a water-jet vacuum and finally under a high vacuum (0.1 to 0.01 mm. Hg). The residue is 1197 g. of a triadduct in the form of a colourless, clear, viscous oil which, after having been kept for several days at room temperature, has crystallized almost right through and on titration with 0.1 N-HBr reveals an oxetane value of 4.91 (theoretical value: 5.02). The triether, which is very readily soluble in all usual organic solvents, can be recrystallized by taking the crude product up in acetone, cooling the acetonic solution to $-50°$ C. to $-60°$ C., rapidly sucking off the crystallizate formed, shortly rinsing it with hexane and then drying it under a high vacuum (0.01 to 0.005 mm. Hg) at room temperature. The pure triadduct thus obtained melts at 68 to 71° C.

Elementary analysis: Calculated, percent: C, 60.28; H, 8.60; N, 7.03; O, 24.09. Found: C, 59.99; H, 8.69; N, 6.65; O, 24.49.

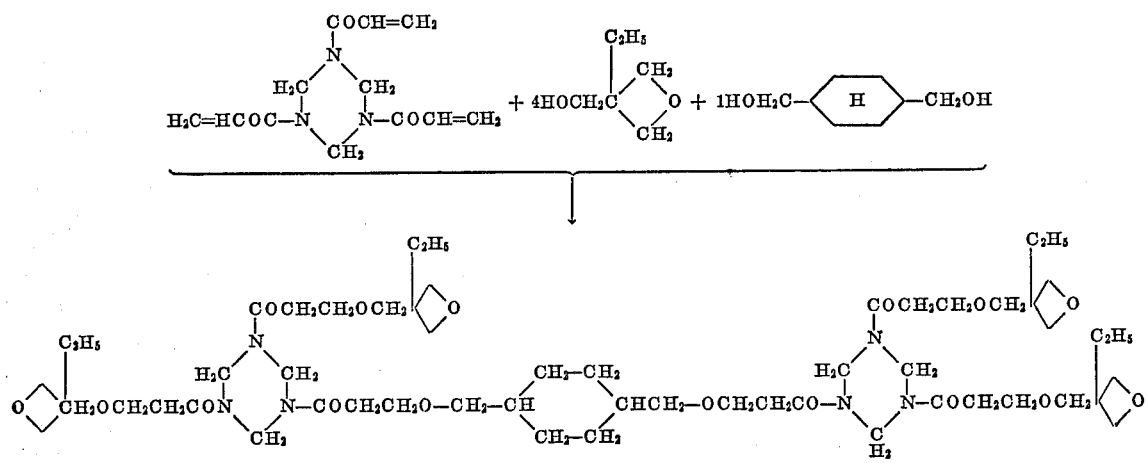

A 1-litre three-necked flask, equipped as described in Example 1 with agitator, thermometer and dropping funnel, is charged with 92.9 g. (0.8 mol) of oxetancarbinol, and while heating and stirring 0.12 g. (0.0052 gram atom) of sodium is dissolved in it. When all metal has dissolved, a solution of 28.8 g. (0.2 mol) of cyclohexane-dimethanol (mixture of 75% of the trans-isomer and 25% of the cis-isomer) in 120 ml. of methylenechloride is added. While cooling with ice-water, a solution of 99.6 g. (0.4 mol) of triacryloyl-perhydrotriazine in 600 ml. of methylenechloride is dropped in within 25 to 30 minutes at a rate such that the temperature of the reaction mixture can be maintained at 14 to 16° C. When all of the unsaturated amide has been added, the batch is stirred on for 2 to 3 hours at room temperature, then neutralized by adding concentrated hydrochloric acid, and the product is filtered off through kieselguhr. Finally, the methylenechloride is expelled as quantitatively as possible according to Example 1, to leave 214 g. of the above-mentioned adduct in the form of a substantially colourless, highly viscous oil having an oxetane value of 3.54 (calculated: 3.61).

Example 3.—Coadduct of 3-ethyl-3 - hydroxymethyl - 1-oxacyclobutane and ethyleneglycol on to triacryloyl-perhydrotriazine at the molecular ratio of 2.2:0.55:1

A 500 ml. four-necked flask equipped with agitator, condenser and dropping funnel is charged with 49.8 g. (0.2 mol) of triacryloyl-perhydrotriazine and 200 ml. of dioxane, and then in the course of 12 minutes a solution of 51.1 g. (0.44 mol) of oxetanecarbinol, 6.8 g. 0.11 mol) of ethyleneglycol and 1.74 g. of 86% caustic potash (as catalyst) in 50 ml. of dioxane is dropped in at a rate such that the temperature of the reaction mixture rises from 20° C. to a maximum of 39° C. After stirring on for 6 hours at an internal temperature of 55° C., the whole is cooled, the alkali neutralized with concentrated hydrochloric acid, a small quantity of decolorizing carbon is added and the batch is filtered through kieselguhr (trade mark "Hyflo-Supercel"). The dioxane is then expelled at first at a bath temperature of 50° C. under a water-jet vacuum and then the excess oxetanecarbinol under a high vacuum (0.01 to 0.05 mm. Hg), to leave behind 93.2 g. (=91% of theory) of a yellowish resin which is viscous at room temperature.

Example 4.—Coadduct from 3-ethyl-3-hydroxymethyl-1-oxacyclobutane and tris-hydroxymethyl-propane on to triacryloyl-perhydrotriazine at the molecular ratio of 2:0.5:1

A four-necked flask equipped with thermometer, condenser and agitator is charged with 69.6 g. (0.6 mol) of oxetanecarbinol, 20.1 g. (0.15 mol of tris-hydroxymethyl-propane, 2.5 g. of 90% caustic potash (as catalyst) and 80 ml. of dioxane. Then 74.8 g. (0.3 mol) of triacryloyl-perhydrotriazine are added portionwise; the whole is suspended in 130 ml. of dioxane, making sure that the temperature does not exceed 30° C. by occasional ice-cooling, then stirred for 4 hours at an internal temperature of 55° C. The reaction product is cooled to room temperature, the alkali neutralized with the equivalent quantity of concentrated hydrochloric acid and the product is suctioned off through kieselguhr (trademark "Hyflo-Supercel"). The dioxane is then expelled first at a bath temperature of 50° C. under a water-jet vacuum and finally, to remove any excess or unreacted oxetanecarbinol, under a high vacuum (0.01 to 0.05 mm. Hg) until no more distillate is obtained. The residue is 157.6 g. (=95.8% of theory) of the coadduct as a light-yellow resin which is very viscous at room temperature.

Example 5.—Coadduct from 3-ethyl-3-hydroxymethyl-1-oxacyclobutane and 4,4'-bis-(hydroxymethyl)-diphenyl oxide on to triacryloylperhydrotriazine at the molecular ratio of 2:0.5:1

A 500 ml. three-necked flask equipped with thermometer, agitator and dropping funnel is charged with 46.5 g. (0.4 mol) of oxetanecarbinol, 23.0 g. (0.1 mol) of 4,4'-bis-(hydroxymethyl)-diphenyl oxide and 0.62 g. of sodium metal, and the whole is stirred at a bath temperature of 100° C. until all sodium has dissolved. The reaction mixture is then cooled to room temperature and 100 ml. of methylenechloride are added, whereupon an emulsion forms. This emulsion is mixed dropwise with a solution of 49.8 g. (0.2 mol) of triacryloyl-perhydrotriazine in 300 ml. of methylenechloride within 10 minutes, while keeping the temperature of the reaction mixture at 14 to 23° C. by occasional cooling with ice water, during which at first undissolved dicarbinol passes into solution. The batch is then stirred on for 3 hours at room temperature and the alkali is neutralized with 2.05 ml. of concentrated hydrochloric acid. A small quantity of decolorizing carbon is added and the whole filtered through kieselguhr (trademark "Hyflo-Supercel"). From the clear, only faintly yellowish filtrate first the methylenechloride is removed under a water-jet vacuum at 20° C. and then, after having raised the bath temperature to 50° C., under a high vacuum the unreacted oxetanecarbinol until the weight of the residue remains constant, to yield a substantially colourless resin which is rather viscous at room temperature. Yield: 112.2 g., corresponding to 94.2% of the theoretical.

Example 6

165 parts of hexachloro-endomethylene-tetrahydrophthalic anhydride are dissolved at 120° C. in 100 parts of the trisoxetane described in Example 1, and 1 part of benzyldimethylamine is added as curing accelerator. A specimen of this casting resin mixture is poured at 120° C. in an aluminium mould (40 x 10 x 140 mm.) heated for 14 hours at 120° C. and then additionally cured for 14 hours at 150° C. The casting obtained in this manner possesses the following properties:

Flexural strength (VSM 77103) _____kg./mm.$^2$__ 8.8
Deflection on fracture (VSM 77103) _____mm__ 4.2
Impact strength (VSM 77105) ____cm. kg./cm.$^2$__ 6.0
Heat distortion point according to Martens (DIN 53458) _____° C__ 170
Water absorption after 4 days' storage in water at 25° C. _____percent__ 0.21

With another specimen its potlife was measured by way of the increase in viscosity at 120° C.; after 89 minutes 1500 centipoises were recorded.

Example 7.—Curing the trisadduct from oxetanecarbinol prepared as described in Example 1 on to triacryloyl-perhydrotriazine 57 parts by weight of the trisadduct described in Example 1 are mixed with 37.7 g. of finely powdered phthalic anhydride in a beaker and the mixture is heated at 100° C. until a clear solution has formed. This solution is poured into an aluminium mould (40 x 10 x 140 mm.) and cured for 8 hours each at 100° C., 130° C. and 160° C. The casting removed from the mould is yellowish brown and reveals on testing the following properties:

Flexural strength (VSM 77103) _____kg./mm.$^2$__ 13.6
Deflection on fracture (VSM 77103) _____mm__ 8.0
Impact strength (VSM 77105) ____cm. kg./cm.$^2$__ 7.1
Heat distortion point according to Martens (DIN 53458) _____° C__ 92
Water absorption after 4 days' storage in water at 25° C. _____percent__ 0.44

Example 8.—Curing the coadduct prepared as described in Example 3 with phthalic anhydride A mixture of 61.0 g. of coadduct, 34.4 g. of finely powdered phthalic anhydride and 1.54 g. of an aqueous solution of 62% strength of trimethyl-benzyl-ammonium-chloride (corresponding to 1% of the weight of the mixture of reactants) is heated at 100° C. until the anhydride has dissolved and then cured as described in Example 7. The dark-brown casting reveals on physical examination the following values:

Flexural strength (VSM 77103) _____kg./mm.$^2$__ 12.6
Deflection on fracture (VSM 77103) _____mm__ 6.7
Impact strength (VSM 77105) ____ cm. kg./cm.$^2$__ 8.5
Heat distortion point according to Martens (DIN 53458) _____ °C.__ 50
Water absorption after 4 days' storage in water at
25° C. _____percent__ 2.4

Example 9.—Curing the coadduct prepared as described in Example 4 with phthalic anhydride 65.0 grams of the above-mentioned coadduct and 32.7 g. of finely powdered phthalic anhydride are dissolved at 100° C. as described in Example 7, and the solution is poured into an aluminium mould and heated for 8 hours each at 100°, 130° and 160° C. The resulting yellowish brown casting possesses the following physical properties:

Flexural strength (VSM 77103) _____kg./mm.$^2$__ 12.1
Deflection on fracture (VSM 77103) _____mm__ 7.0
Impact strength (VSM 77105) ____cm. kg./cm.$^2$__ 7.8
Heat distortion point according to Martens (DIN 53458) _____ °C__ 58
Water absorption after 4 days' storage in water 25° C. _____percent__ 0.93

Example 10.—Curing the coadduct of Example 5 with phthalic anhydride

As described in Example 7, a mixture of 63.0 g. of the coadduct, 32.1 g. of finely powdered phthalic anhydride and 1.53 g. of an aqueous solution of 62% strength of trimethylbenzyl-ammoniumhydrochloride (as curing accelerator) is dissolved and cured in an aluminium mould for 8 hours each at 100°, 130° and 160° C. The resulting dark yellow casting reveals the following physical test values:

Flexural strength (VSM 77103) _____kg./mm.$^2$__ 11.9
Deflection on fracture (VSM 77103) _____mm__ 6.2
Impact strength (VSM 77105) ____ cm. kg./cm.$^2$__ 11.4
Heat distortion point according to Martens (DIN 53458) _____ °C__ 66
Water absorption after 4 days' storage in water at 25° C. _____percent__ 0.33

What is claimed is:
1. A polyoxetane of the formula

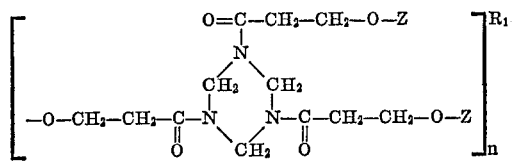

where Z represents a residue of the formula

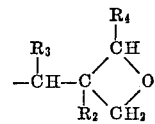

in which $R_2$ represents a lower alkyl radical containing 1 to 4 carbon atoms, $R_3$ and $R_4$ each represents a member selected from the group consisting of hydrogen atom and the methyl group, $n$ is an integer of at least 1 and at most 3, and $R_1$, when $n$ is 1, represents a member selected from the group consisting of the residue Z, the residue of a monohydric alcohol selected from the group consisting of methanol, ethanol and n-butanol obtained by elimination of the alcoholic hydroxyl group and the residue of a ethylene glycol monoethyl ether obtained by elimination of the alcoholic hydroxyl group, and $R_1$ when $n$ is at least 2 and at most 3, represents a member selected from the group consisting of the residue of a n-hydric alcohol obtained by elimination of at least 2 and at most 3 alcoholic hydroxyl groups and the residue of a n-hydric ether alcohol obtained by elimination of at least 2 and at most 3 alcoholic hydroxyl groups, said n-hydric alcohol and n-hydric ether alcohol being a member selected from the group consisting of cyclohexane-1,1-dimethanol, trimethyleneglycol-(1,3), butyleneglycol-(1,4), butene(2)-diol-(1,4), diethyleneglycol, triethyleneglycol, diglycol ether, para, para'-bis-(hydroxymethyl)-diphenyl ether and N,N'-bis-(hydroxymethyl)-alkanedicarboxylic acid diamides such as N,N'-bis-(hydroxymethyl)-adipic acid diamide, trimethylolethane, trimethylolpropane and 2,2-bis-(hydroxymethyl)-3-hydroxybutane.

2. Polyoxetane according to claim 1, where $R_1=Z$ and $n=1$.

3. A polyoxetane according to claim 1, where the residue Z represents a residue of the formula

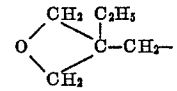

4. 1,3,5-tris[β-(3'-ethyl-1'-oxacyclobutyl-3'-methyloxy) propionyl]-perhydrotriazine.

References Cited
UNITED STATES PATENTS
3,028,385    4/1962    Batzer et al. _____ 260—248

HENRY R. JILES, Primary Examiner.
JOHN M. FORD, Assistant Examiner.

U.S. Cl. X.R.
8—62, 87, 115.6; 117—143, 155; 252—8.57, 8.8; 260—67.6, 77.5